US007814194B2

(12) United States Patent
Hellerstein et al.

(10) Patent No.: US 7,814,194 B2
(45) Date of Patent: Oct. 12, 2010

(54) METHOD AND SYSTEM FOR MACHINE-AIDED RULE CONSTRUCTION FOR EVENT MANAGEMENT

(75) Inventors: Joseph L. Hellerstein, Ossining, NY (US); Sheng Ma, Ossining, NY (US); David A. Rabenhorst, Woodcliff Lake, NJ (US)

(73) Assignee: International Business Machines Corporation, Armonk, NY (US)

( * ) Notice: Subject to any disclaimer, the term of this patent is extended or adjusted under 35 U.S.C. 154(b) by 2114 days.

(21) Appl. No.: 09/731,937

(22) Filed: Dec. 7, 2000

(65) Prior Publication Data
US 2002/0073195 A1    Jun. 13, 2002

(51) Int. Cl.
*G06F 15/173* (2006.01)
(52) U.S. Cl. ............. 709/224; 709/217; 379/201.3
(58) Field of Classification Search ............. 709/224, 709/217; 379/201.3, 201.03
See application file for complete search history.

(56) References Cited

U.S. PATENT DOCUMENTS

| 5,661,668 A | | 8/1997 | Yemini et al. |
| 5,727,197 A | * | 3/1998 | Burgess et al. ............ 707/2 |
| 5,874,955 A | | 2/1999 | Rogowitz et al. |
| 6,115,741 A | * | 9/2000 | Domenikos et al. ......... 709/217 |
| 6,167,448 A | * | 12/2000 | Hemphill et al. ........... 709/224 |
| 6,260,040 B1 | * | 7/2001 | Kauffman et al. ............ 707/10 |
| 6,446,136 B1 | * | 9/2002 | Pohlmann et al. ........... 719/318 |
| 6,477,575 B1 | * | 11/2002 | Koeppel et al. ............ 709/224 |
| 6,584,186 B1 | * | 6/2003 | Aravamudan et al. .. 379/201.03 |
| 6,658,417 B1 | * | 12/2003 | Stakutis et al. ............. 707/10 |

OTHER PUBLICATIONS

U.S. Appl. No. 09/359,874, filed Jul. 27, 1999, System and Method for Exploratory Analysis of Data for Event Management.
K.R. Milliken et al., "YES/MVS and the Automation of Operations for Large Computer Complexes," IBM Systems Journal, vol. 25, No. 2, pp. 159-180, 1986.
Computer Associates International, "Neugents. The Software That Can Think," http://www.cai.com/neugents, 2 pages, Jul. 16, 1999.
S. Ma et al., "EventBrowser: A Flexible Tool For Scalable Analysis of Event Data," Distributed Operations and Management, pp. 1-12, Apr. 15, 1999.
T.M. Mitchell, "Machine Learning," McGraw Hill, pp. 29-33, 1997.

* cited by examiner

*Primary Examiner*—Tammy T Nguyen
(74) *Attorney, Agent, or Firm*—Ryan, Mason & Lewis, LLP

(57) ABSTRACT

Methods and systems are described for learning correlation rules used in event management. In one aspect of the invention, a method comprises the steps of: (a) marking one or more event groupings; (b) employing a machine learning program to learn the underlying concept of these groupings; (c) including a rule right-hand side; and (d) putting the new rule in the Rule DB. A system to implement this method may comprise components for: (1) interactive visualization and user interface control; (2) query-based learning; (3) Event DB access; and (4) correlation Rule DB access.

20 Claims, 8 Drawing Sheets

A, B, C ARE HUBS ATTACHED TO SUBNET 15.2.3
X IS NOT A HUB AND IS ON 15.2.3
D IS A HUB BUT IS NOT ATTACHED TO 15.2.3

A, B, C ARE HUBS ATTACHED TO SUBNET 15.2.3
X IS NOT A HUB AND IS ON 15.2.3
D IS A HUB BUT IS NOT ATTACHED TO 15.2.3

A, B, C ARE HUBS ATTACHED TO SUBNET 15.2.3
X IS NOT A HUB AND IS ON 15.2.3
D IS A HUB BUT IS NOT ATTACHED TO 15.2.3

METHOD AND SYSTEM FOR MACHINE-AIDED RULE CONSTRUCTION FOR EVENT MANAGEMENT

FIELD OF THE INVENTION

The present invention relates generally to network and systems management and, more particularly, to detecting and resolving availability and performance problems.

BACKGROUND OF THE INVENTION

With the dramatic decline in the price of hardware and software, the cost of ownership for computing devices is increasingly dominated by network and systems management. Included here are tasks such as establishing configurations, help desk support, distributing software, and ensuring the availability and performance of vital services. The latter is particularly important since inaccessible and/or slow services decrease revenues and degrade productivity.

The first step in managing availability and performance is event management. Almost all computing devices have a capability whereby the onset of an exceptional condition results in the generation of a message so that potential problems are detected before they lead to widespread service degradation. Such exceptional conditions are referred to as "events." Examples of events include: unreachable destinations, excessive central processing unit (CPU) consumption, and duplicate Internet Protocol (IP) addresses. An event message contains multiple attributes, especially: (a) the source of the event; (b) type of event; and (c) the time at which the event was generated.

Event messages are sent to an "event management system (EMS)." An EMS has an "adaptor" that parses the event message and translates it into a normalized form (an adaptor). This normalized information is then placed into an "event database (Event DB)." Next, the normalized event is fed into a "correlation engine" that determines actions to be taken. This determination is typically driven by correlation rules that are kept in a rule database (Rule DB). Examples of processing done by correlation rules includes:

1. Elimination of duplicate messages. Duplicate is interpreted broadly here. For example, if multiple hosts on the same local area network generate a destination-unreachable message for the same destination, then the events contain the same information.
2. Maintenance of operational state. State may be as simple as which devices are up (e.g., operating) and which are down (e.g., not operating). It may be more complex as well, especially for devices that have many intermediate states or special kinds of error conditions (e.g., printers).
3. Problem detection. A problem is present if one or more components of the system are not functioning properly. For example, the controller in a load balancing system may fail in a way so that new requests are always routed to the same back-end web server, a situation that can be tolerated at low loads but can lead to service degradation at high load. Providing early detection of such situations is important in order to ensure that problems do not lead to widespread service disruptions.
4. Problem isolation. This involves determining the components that are causing the problem. For example, distributing a new release of an application that has software errors can result in problems for all end-users connecting to servers with the updated application. Other examples of problem causes include: device failure, exceeding some internal limit (e.g., buffer capacity), and excessive resource demands.

The correlation engine provides automation that is essential for delivering cost effective management of complex computing environments. Existing art provides three kinds of correlation. The first employs operational policies expressed as rules, see, e.g., K. R. Milliken et al., "YES/MVS and the Automation of Operations for Large Computer Complexes," IBM Systems Journal, vol. 25, no. 2, 1986. Rules are if-then statements in which the if-part tests the values of attributes of individual events, and the then-part specifies actions to take. An example of such a rule is: "If a hub generates an excessive number of interface-down events, then check if the software loaded on the hub is compatible with its hardware release." The industry experience has been that such rules are difficult to construct, especially if they include installation-specific information.

Another approach has been developed by SMARTS (Systems Management Arts) based on the concept of a code book that matches a repertoire of known problems with event sequences observed during operation. This is described in U.S. Pat. No. 5,661,668 issued to Yemini et al. on Aug. 26, 1997 and entitled "Apparatus and Method for Analyzing and Correlating Events in a System Using a Causality Matrix." Here, operational policies are models of problems and symptoms. Thus, accommodating new problems requires properly modeling their symptoms and incorporating their signatures into a code book. In theory, this approach can accommodate installation-specific problems. However, doing so in practice is difficult because of the high level of sophistication required to encode installation-specific knowledge into rules.

Recently, a third approach to event correlation has been proposed, see, e.g., Computer Associates International, "Neugents. The Software that can Think," http://www.ca-i.com/neugents, Jul. 16, 1999. This approach trains a neural network to predict future occurrences of events based on factors characterizing their occurrence in historical data. Typically, events are specified based on thresholds, such as CPU utilization exceeding 90%. The policy execution system uses the neural network to determine the likelihood of one of the previously specified events occurring at some time in the future. While this technique can provide advanced knowledge of the occurrence of an event, it still requires specifying the events themselves. At a minimum, such a specification requires detailing the following:
1. The variable measured (e.g., CPU utilization);
2. The directional change considered (e.g., too large); and
3. The threshold value (e.g., 90%).

The last item can be obtained automatically from examining representative historical data. Further, graphical user interfaces can provide a means to input the information in items (2) and (3). However, it is often very difficult for installations to choose which variables should be measured and the directional change that constitutes an exceptional situation.

To summarize, existing art for event management systems is of three types. The first type (e.g., as in the K. R. Milliken et al. article, 1986) requires that correlation rules be specified by experts, a process that is time-consuming and expensive. The second type (e.g., as in the Yemini et al. patent) reduces the involvement of experts but only for aspects of event management that share broad commonalties (e.g., IP connectivity). The third type (e.g., Computer Associates International's Neugent software, 1999) attempts to automate the construction of correlation rules for a broader range of management areas. However, to date, this has not been done in a manner that provides for customization by experts, especially in a way that avoids dealing with low-level details (e.g., specific threshold values, the choice of measurement values, and directional changes of interest for these variables).

More broadly, no existing EMS provides decision support for constructing correlation rules. At best, existing art provides authoring systems that aid in syntax checking and formatting. However, no assistance is provided for translating examples of event patterns (e.g., drawn from historical data) into correlation rules.

SUMMARY OF THE INVENTION

The present invention addresses the problem of decision support for constructing correlation rules for event management. The invention provides systems and methods for visualizing event data and machine-based processing of this data to aid in rule construction. We refer to this process as "machine-aided rule construction."

Providing decision support for rule construction requires capabilities for visualizing and describing patterns in terms of rule "left-hand sides." By a rule left-hand side (LHS), we refer to the condition or predicate portion of a rule. By contrast, the "right-hand side" (RHS) of a rule specifies the action to be taken dependent on the results of an evaluation of the condition or predicate on the left-hand side.

With respect to visualization, various methods may be employed in accordance with the present invention. For example, in one embodiment, the visualization methodologies described in the U.S. patent application identified by Ser. No. 09/359,874 filed on Jul. 27, 1999 and entitled "System and Method for Exploratory Analysis of Data for Event Management," and in S. Ma et al., "EventBrowser: A Flexible Tool for Scalable Analysis of Event Data," Distributed Operations and Management, 1999, the disclosures of which are incorporated herein by reference, may be employed. Alternatively, the visualization methodologies described in U.S. Pat. No. 5,874,955 issued to Rogowitz et al. on Feb. 23, 1999 and entitled "Interactive Rule Based System with Selection Feedback that Parameterizes Rules to Constrain Choices for Multiple Operations," the disclosure of which is incorporated by reference herein, may be employed. One of ordinary skill in the art will realize various other methods for providing event data visualizations that may be employed in accordance with the present invention.

The present invention also makes use of machine learning algorithms to describe patterns in terms of rules. A preferred framework adopted for use with the invention may be learning concepts expressed as predicates on attributes, see, e.g., T. M. Mitchell, "Machine Learning," McGraw Hill, 1997, the disclosure of which is incorporated herein by reference. In essence, a concept is a where-clause as expressed in the structured query language (SQL). An example is: "All events originate from subnet 15.2.3 and the event rate exceeds 0.75 per second." Here, the attribute subnet must have the value 15.2.3 and the total number of events divided by the time-span in seconds of the group must exceed 0.75.

Learning concepts is greatly facilitated by using one or more "abstraction hierarchies." An example of a two level hierarchy is: (a) the host itself (e.g., yahoo.com); and (b) its type (e.g., file server, web server, name server). A more extensive hierarchy might be based on the kind of interactions (workload) being done such as: (i) the specific transaction; (ii) the user performing the transaction; (iii) the user's department; and (iv) the division in which the user works. In both cases, there is containment in that higher levels encompass lower ones. In event management, there are often multiple hierarchies (e.g., time, configuration, workload, event type).

A broad class of learning algorithms which may be employed in accordance with the invention, e.g., generalization-specialization algorithms as described in T. M. Mitchell, "Machine Learning," McGraw Hill, 1997, uses abstraction hierarchies in two ways. First, when a positive example is encountered that is not covered by the current set of predicates, the level of one or more abstraction hierarchies is increased to include this example. Second, when a negative example is encountered that is covered by the predicate, the level of one or more abstraction hierarchies is decreased. Various schemes are used to optimize that hierarchy level chosen to maximize the number of positive examples covered and minimize the number of negative examples covered.

Accordingly, in one aspect of the invention, a machine-aided correlation rule construction methodology comprises a series of interactions between an analyst, e.g., a domain expert, and a rule construction system, formed in accordance with the invention (hereinafter referred to as the "machine"), whereby correlation rules are constructed. The methodology comprises the steps of: (1) the analyst marking one or more event groupings; (2) the machine learning the left-hand side for event patterns; (3) the analyst adding the right-hand side; and (4) the machine placing the rule in a rule database (Rule DB) that is used by the correlation engine of an event management system (EMS). Step (1) is greatly aided by having an effective tool for visualizing and interacting with event groups. Step (2) employs machine-learning techniques, especially query-based learning and generalization-specialization hierarchies that allow a machine to choose the best level of an abstraction hierarchy to cover positive examples of an event pattern (and avoid negative examples). By positive examples, it is meant a grouping of events that are an instance of the situation being characterized. A negative example is a mistaken identification, i.e., events that are not an instance of the situation being characterized.

To elaborate, in accordance with the invention, learning a left-hand side means determining the predicates necessary to describe a set of event groupings. Predicates comprise logical statements about attribute values. For example, in an IP network, it may be that event groups are characterized originating from hubs, on subnet 9.2.16, with an event rate of 0.5 per second. Then, the invention utilizes a learning algorithm to determine these predicates.

The foregoing method may be augmented by incorporating data mining algorithms to aid in finding patterns of interest. These patterns can, in essence, seed the process of finding left-hand sides of rules.

In one aspect of a rule construction system or machine formed in accordance with the present invention, the machine comprises components for interactive visualization, learning event patterns, rule construction, event data access, and Rule DB access. The visualization system in conjunction with event data access provide a mechanism for analysts to select event groupings that are then translated into left-hand sides by the pattern learner. Rule construction in combination with Rule DB access provide a mechanism for adding the rule right-hand side and placing the result in the Rule DB.

Considerable benefits accrue from the present invention. First, the construction of correlation rules is made easier in that left-hand sides of rules can be generated automatically. Clearly, this is a productivity benefit in that expressing left-hand sides can be time consuming. In addition, this capability can allow those who are knowledgeable about operations to develop rules even though they may not be trained in constructing correlation rules.

Another benefit of the present invention relates to the assessment of correlation rules once they are constructed. In existing art, rules are evaluated by using them in production systems. While in some sense this is the ultimate test, it may be some time before a situation arises when the rule is invoked. Thus, in accordance with the invention, a complementary approach is to apply the rule's left-hand side to historical data, selecting instances of the patterns specified by the rule. By so doing, the operations staff can determine if the situations for which the rule is intended are in fact those that will be selected in production.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

The present invention will be described below in the context of an exemplary event management system architecture. However, it is to be understood that the invention is not limited to use with any particular event management system architecture but is rather more generally applicable for use in accordance with any event management systems in which it is desirable to provide decision support for constructing correlation rules.

Figure 1:
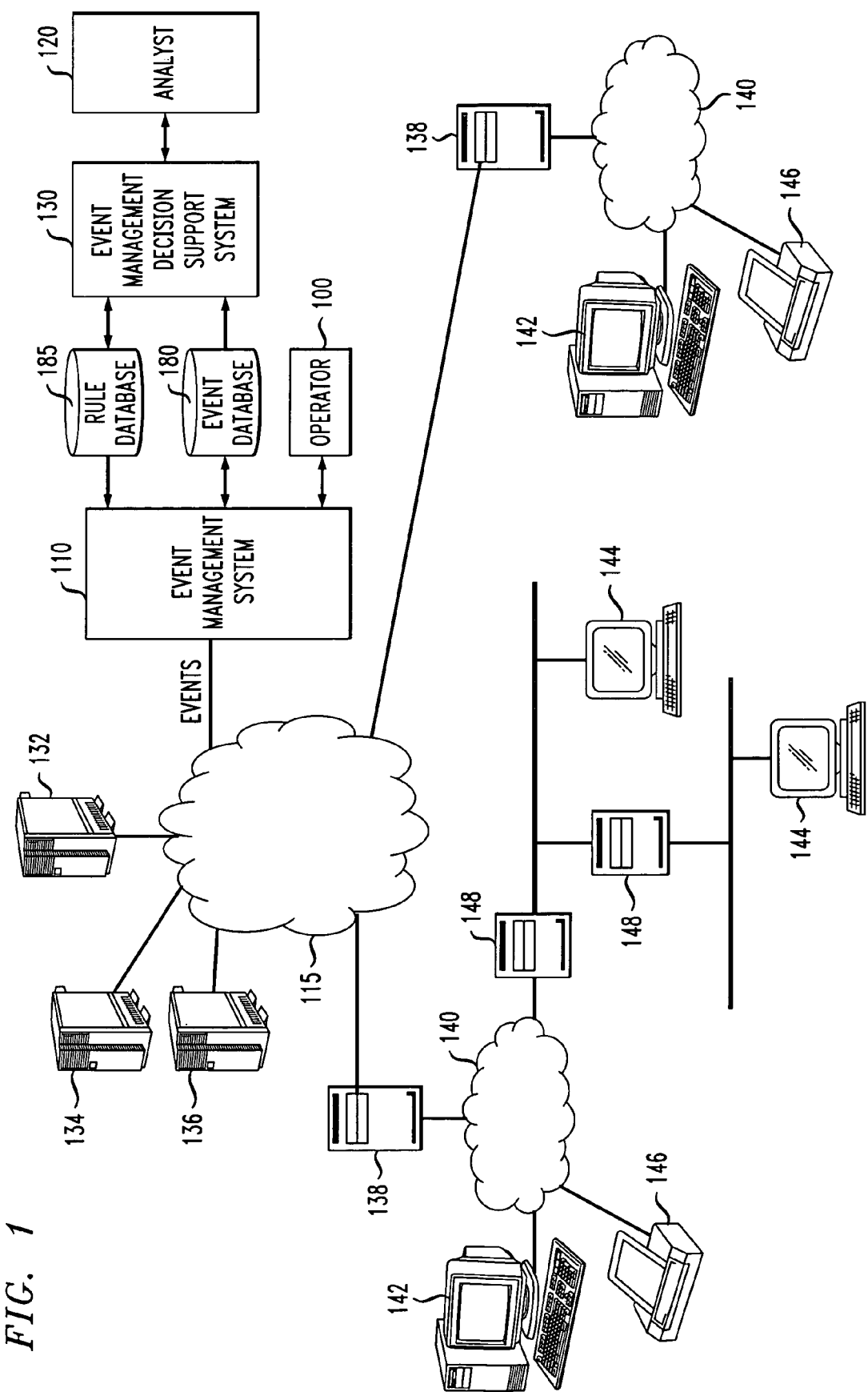
FIG. 1 is a block diagram illustrating an overall architecture in which a machine-aided rule construction system for event management according to an embodiment of the present invention may operate.

Referring initially to FIG. 1, a block diagram illustrates an overall architecture in which a machine-aided rule construction system for event management according to an embodiment of the present invention may operate. Generally, FIG. 1 shows an event management decision support system according to the invention operating in association with an event management system in the context of an exemplary network of distributed computing devices with which the present invention may be employed. It is to be appreciated that the event management decision support system is the machine-aided rule construction system of the invention.

Thus, as depicted in FIG. 1, an operator 100 receives alerts and initiates responding actions based on interactions with an event management system 110. The event management system 110 receives events generated by computing devices of various types. The computing devices are connected to the event management system 110 via a network 115. The network 115 may be, for example, a public network (e.g., Internet), a private network, and/or some other suitable network. The computing devices may include, for example, file servers 132, name servers 134, mail servers 136, routers 138, wherein the routers provide connection to the network 115 for work stations 142 and 144, print servers 146 and hub 148 through subnetworks 140.

The event management system 110 updates the event database (Event DB) 180 with newly received events and reads this database to do event correlation based on a rule database (Rule DB) 185. An analyst 120 uses an event management decision support system 130 of the present invention to develop the correlation rules used by the event management system 110 to control the interactions with the operator 100. Doing so requires reading historical event data in the Event DB and writing to the Rule DB. Detailed explanations of the components of the event management decision support system 130 of the present invention will be provided below.

It is to be understood that the operator 100 and the analyst 120 are individuals who may directly interact with the event management system 110 and the event management decision support system 130, respectively, in association with the computer system(s) upon which the event management system 110 and the event management decision support system 130 reside and execute, or they may have their own dedicated computer systems that are in communication with the event management system 110 and the event management decision support system 130, respectively.

Figure 2:
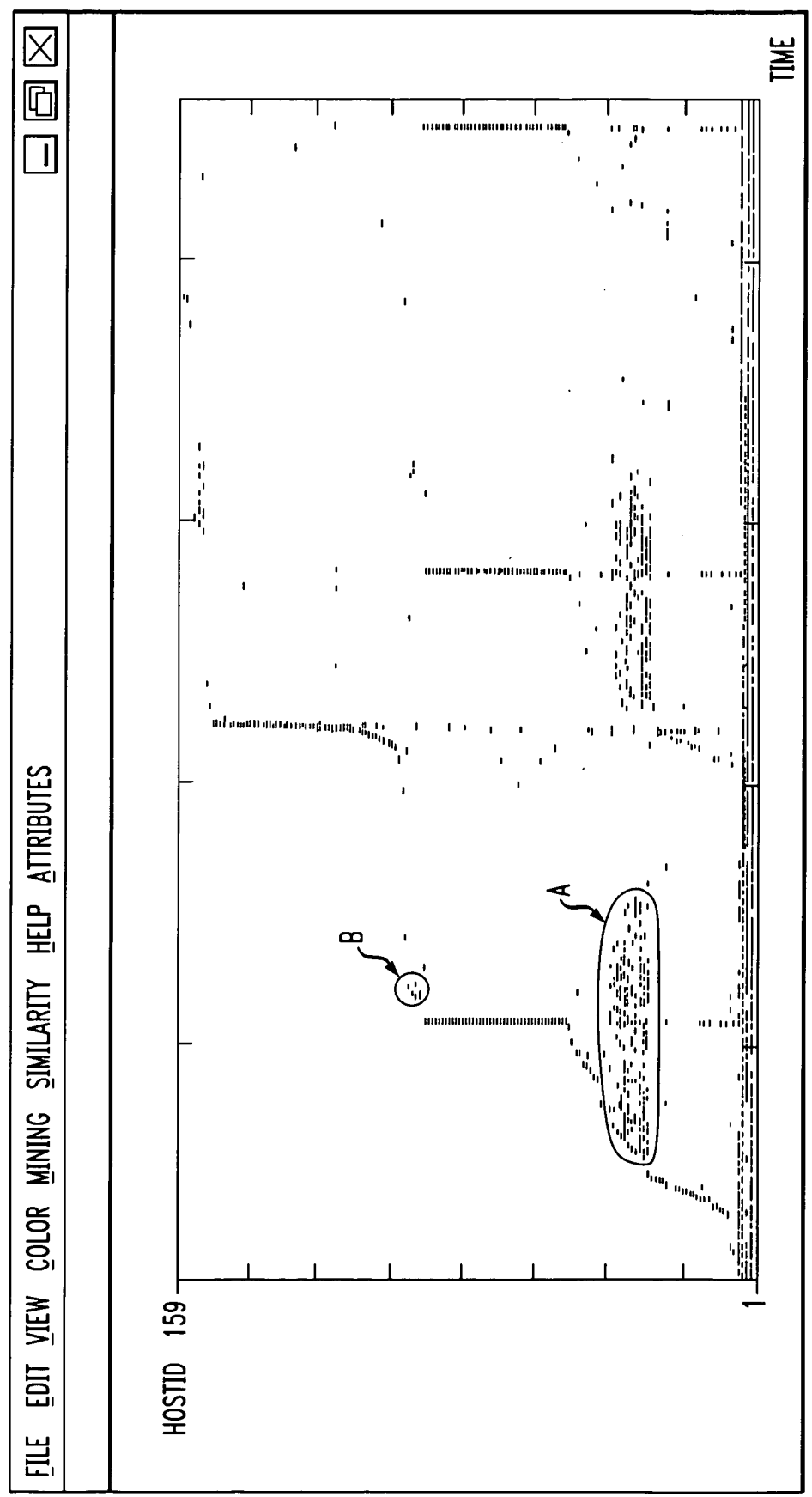
FIG. 2 is a diagram displaying a visualization used to identify groupings of events when learning the left-hand side of rules for use according to an embodiment of the present invention.

Referring now to FIG. 2, a diagram displays a visualization used to identify groupings of events when learning the left-hand side of rules for use according to an embodiment of the present invention. That is, FIG. 2 depicts an example of the kind of event data display or visualization used by the event management decision support system 130 to identify patterns that should be translated into the left-hand side of rules. While any suitable data visualization methodology may be employed, the visualization methodology used to generate the display in FIG. 2 is described in the above-referenced U.S. patent application identified by Ser. No. 09/359,874 filed on Jul. 27, 1999 and entitled "System and Method for Exploratory Analysis of Data for Event Management," and in S. Ma et al., "EventBrowser: A Flexible Tool for Scalable Analysis of Event Data," Distributed Operations and Management, 1999. One of ordinary skill in the art will realize various other methods for providing event data visualizations that may be employed in accordance with the present invention, e.g., the visualization methodologies described in the above-referenced U.S. Pat. No. 5,874,955 issued to Rogowitz et al. on Feb. 23, 1999 and entitled "Interactive Rule Based System with Selection Feedback that Parameterizes Rules to Constrain Choices for Multiple Operations."

Nonetheless, as shown in FIG. 2, many patterns may be present, including periodicities and event bursts. Also, patterns may exist at multiple time-scales. The data visualization is preferably a two dimensional plot, which represents an event as a point using any two attributes of an event as two axes. As an example, FIG. 2 plots host ID versus time. A "dash" at (x, y) in FIG. 2 corresponds to an event message and represents that host y has an event at time x. The two axes can also be changed to any attribute. As mentioned above and as will be explained below in detail, the methodology of the invention uses positive examples and negative examples in constructing rules. By positive examples, it is meant a grouping of events that are an instance of the situation being characterized. This may include, for example, the cloud-like pattern of events denoted by the circle referenced as letter 'A' in FIG. 2. A negative example is a mistaken identification, i.e., events that are not an instance of the situation being characterized. This may include, for example, the pattern of events denoted by the circle referenced as letter 'B' in FIG. 2.

Figure 3:
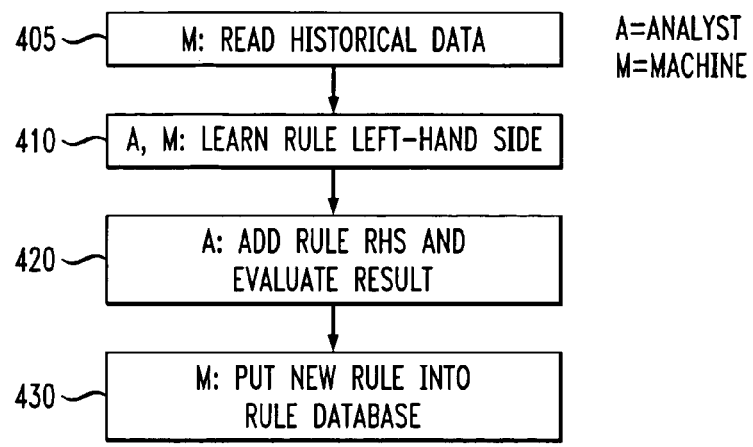
FIG. 3 is a flow diagram illustrating a machine-aided rule construction methodology according to an embodiment of the present invention.

Referring now to FIG. 3, a flow diagram illustrates a machine-aided rule construction methodology according to an embodiment of the present invention. It is to be appreciated that the methodology depicted in FIG. 3 is carried out by the analyst 120 (FIG. 1) and the event management decision support system 130 (FIG. 1). Steps in FIG. 3 (and subsequently in FIG. 4) denoted with the letter "A" are performed by an analyst (human); those that are denoted with the letter "M" are done by the machine (event management decision support system); and those denoted with "A,M" are done collaboratively by the analyst and the machine.

In step 405, the machine reads historical event data. It is to be appreciated that the data visualizations (e.g., FIG. 2) that are used to help generate the rules are formed from historical event data. That is, the events shown in the visualizations are past events. How recent in time or how far back in time the event data is read is a function of the application for which the rules are being constructed. In step 410, the analyst and the machine collaborate to learn the left-hand side (LHS) of rules based on patterns identified in visualizations such as those displayed in FIG. 2. This operation will be explained in detail below in the context of FIG. 4. In step 420, the analyst augments the left-hand side with a right-hand side (RHS) action and the resulting rule is evaluated. This may include applying the rule's left-hand side to historical event data, selecting instances of the patterns specified by the rule. By so doing, the operations staff can determine if the situations for which the rule is intended are in fact those that will be selected in production. In step 430, the machine places the new rule in the Rule DB (185 in FIG. 1) associated with the event management system (110 in FIG. 1).

Figure 4:
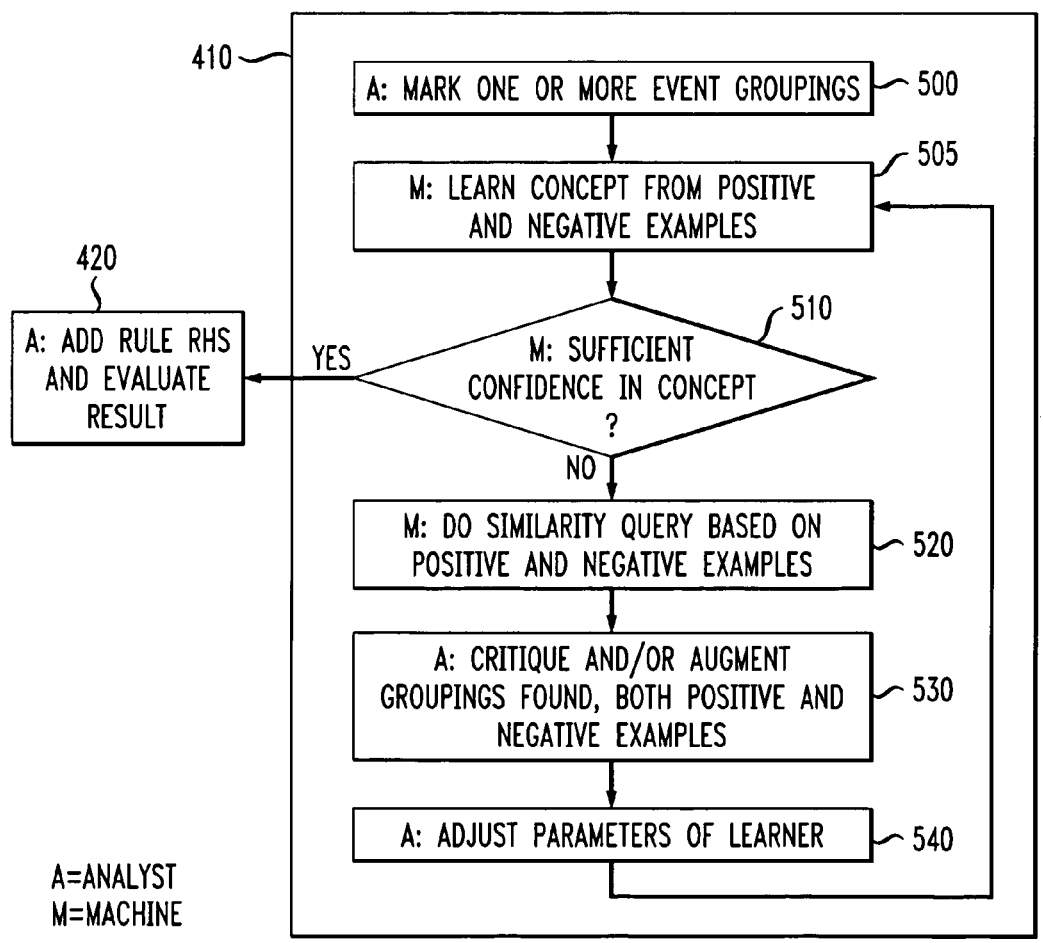
FIG. 4 is a flow diagram illustrating a process for query-based learning of a rule left-hand side according to an embodiment of the present invention.

Referring now to FIG. 4, a flow diagram illustrates a process for query-based learning of a rule left-hand side according to an embodiment of the present invention. Specifically, FIG. 4 provides the details of step 410 in FIG. 3.

Figure 5:
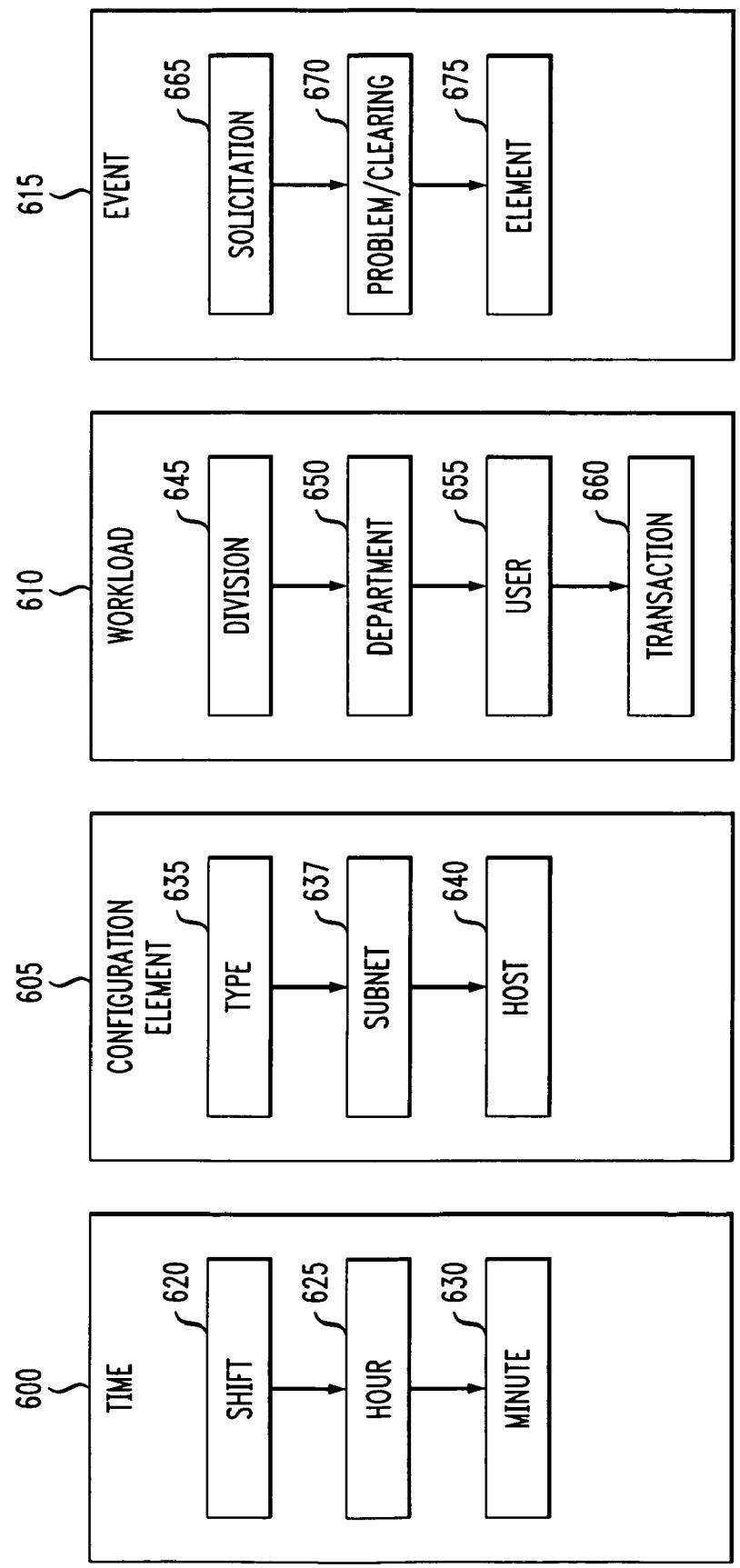
FIG. 5 is a diagram illustrating some hierarchies used in employing a generalization-specialization algorithm to learn rule left-hand sides for use according to an embodiment of the present invention.

As previously mentioned, the present invention makes use of machine learning algorithms to describe patterns in terms of rules. A preferred framework adopted for use with the invention is the learning concepts framework described in the above-referenced T. M. Mitchell, "Machine Learning," McGraw Hill, 1997. The learning concepts framework expresses predicates on attributes. A concept is basically a where-clause as expressed in the structured query language (SQL). In order to facilitate the learning concepts, one or more abstraction hierarchies are used. In event management, there are often multiple hierarchies, e.g., time, configuration, workload, event type (examples of which will be described below in the context of FIG. 5). In particular, the invention employs the generalization-specialization algorithm described by T. M. Mitchell in "Machine Learning," which itself uses abstraction hierarchies in two ways. First, when a positive example is encountered that is not covered by the current set of predicates, the level of one or more abstraction hierarchies is increased to include this example. Second, when a negative example is encountered that is covered by the predicate, the level of one or more abstraction hierarchies is decreased. Various schemes may be used to optimize that hierarchy level chosen to maximize the number of positive examples covered and minimize the number of negative examples covered. Where and how this learning algorithm is used in accordance with the rule construction methodology of the invention is thus described in the context of FIG. 4.

In step 500, the analyst (120 in FIG. 1) marks one or more event groupings from a particular event data visualization (for example, as shown in FIG. 2) and indicates if they are positive or negative examples of the problem to be detected in the rule's left-hand side. Marking may be accomplished, for example, by selecting one or more patterns of events in the visualization presented on a display using a pointing device such as a mouse. Such selection of events may be accomplished with well-known rubber-banding techniques which may, for example, include dragging a rectangle over points of interest, e.g., an event pattern, in order to then perform operations in accordance therewith.

It is also to be appreciated that step 500 may be accomplished in further cooperation with the machine. That is, the selection of event groupings or patterns may be augmented by incorporating a data mining algorithm or component, as is well-known in the art, to aid in finding patterns of interest. These patterns can, in essence, seed the process of finding left-hand sides of rules. Thus, in step 500, the analyst inputs the data mining criteria to the algorithm, which may include a query associated with the event type(s) that is being sought. The algorithm then mines the event database and selects the event groupings that satisfy the query.

Next, in steps 505 through 520, the machine (i.e., the event management decision support system) executes the machine learning algorithm described above to learn the LHS of the rule being constructed. Specifically, in step 505, the machine learns a concept using the positive and negative examples provided by the analyst. In step 510, the machine determines if there are a sufficient number of examples to learn the LHS of the rule. If there are, the flow proceeds to step 420, i.e., add the RHS of the rule and evaluate the result. If there is not, in step 520, the machine looks for similar patterns based on the rule constructed so far. That is, the machine performs a similarity query based on the positive and negative examples. In step 530, the analyst critiques the result by determining if the examples to date accurately reflect the concept to be identified. For example, this may involve: (a) reclassifying a positive example as a negative example or a negative example as a positive example; (b) deleting examples; and (c) including or excluding events in an example so that it better conforms with the concept being learned. Then, in step 540, the analyst may optionally adjust the parameters of the learning mechanism to better operate with the concept being learned. The methodology flow then returns to step 505 where the learning algorithms are again performed followed by a check (step 510) on whether there is sufficient confidence in the concept learned. This process may iterate any number of times until a particular confidence level is attained and the rule LHS is determined.

To elaborate on step 520, consider the preliminary concept "there is a port-down event followed by a port-up event from the same host within 5 seconds." A "host" may be any one of the computing devices illustrated in the network of FIG. 1. The machine seeks other examples of such an event sequence from a single host. One way this can be done is for the machine to do a SQL query that retrieves all event interface-down events. Then for each, the machine also retrieves the events that occurred over the next five seconds from that same host. The machine then checks if one of these events is an interface-up. For those hosts that this is the case, the machine then reports the entire sequence of events from interface-down through interface-up.

Thus, at the end of the overall rule construction process of the invention with respect to such an example, a correlation rule may be constructed with a LHS that states: "When there is a port-down event followed by a port-up event from the same host within 5 seconds," and a RHS that states: "delete the events." That is, it may have been determined that this is a normal pattern and so it should be filtered by the event management system during real-time activities.

As mentioned above, FIG. 5 is a diagram illustrating some hierarchies used in employing the generalization-specialization algorithm to learn concepts for rule left-hand sides. Four hierarchies are shown. In block 600, there is a time hierarchy comprising work shift (610), hour of the day (625), and minute within the hour (630). In block 605, there is a configuration element hierarchy comprising the type of host (635) (e.g., mail server, file server), the subnetwork (637), and the host identifier (640) (e.g., its Internet address). In block 610, there is a workload hierarchy comprising the division in which the user is employed (645), the department (650), and user's name (655), and the transaction (or work unit) being performed by the user (660). In block 615, there is a hierarchy of event types comprising the situation in which the event occurs (665) (e.g., printer failure), the nature of the action (670), and the specifics of the element itself (675). Of course, it is to be understood that these are all just examples of hierarchies and that the specific hierarchies used in accordance with the learning algorithm will depend on the type of network being managed by the event management system.

Figure 6:
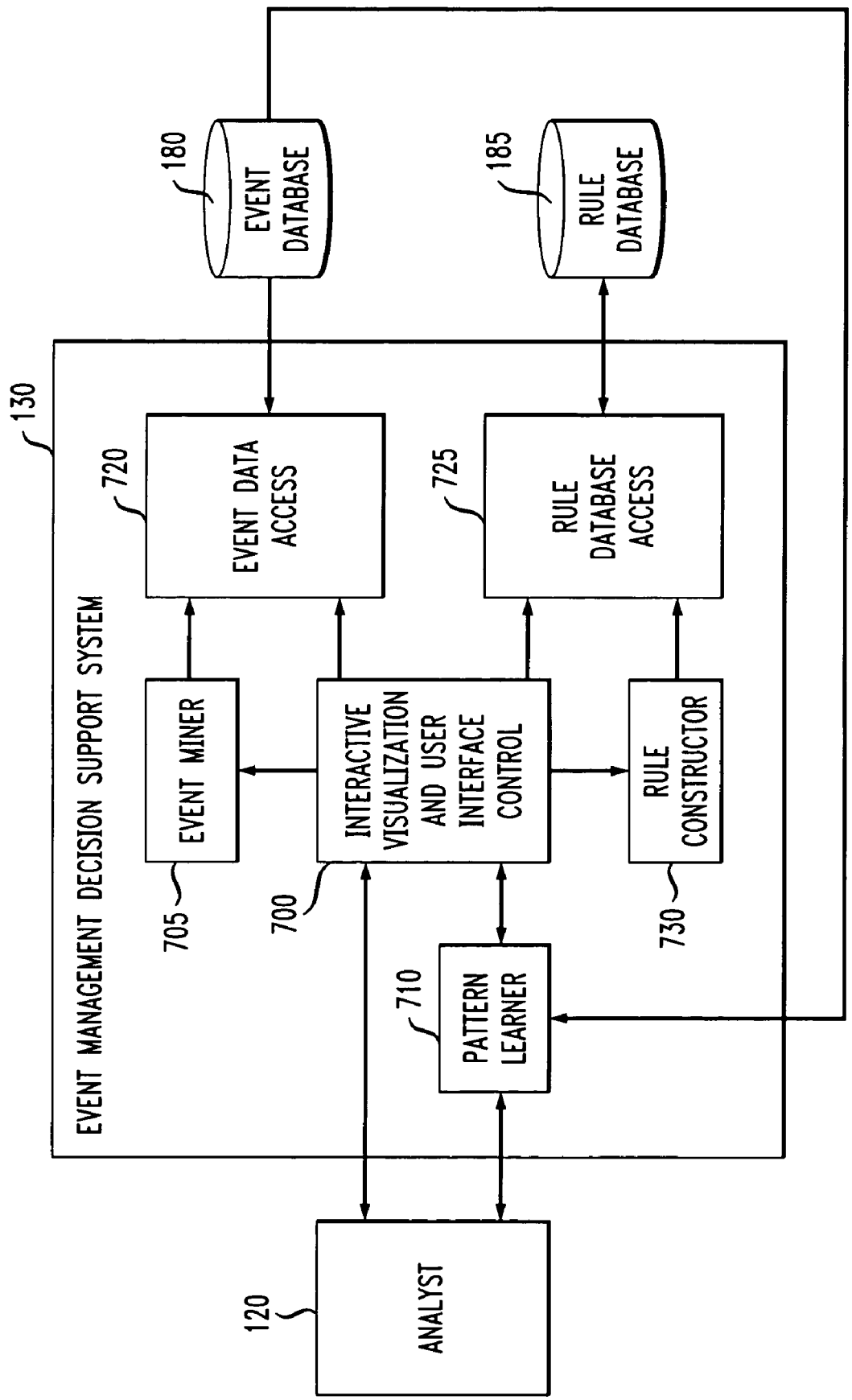
FIG. 6 is a block diagram illustrating a machine-aided rule construction system according to an embodiment of the present invention.

Referring now to FIG. 6, a block diagram illustrates a machine-aided rule construction system according to an embodiment of the present invention. Specifically, FIG. 6 depicts components of an illustrative event management decision support system 130 (FIG. 1). As shown, the decision support system comprises an interactive visualization and user interface control module 700, an event miner module 705, a pattern learner module 710, an event data access module 720, a rule DB access module 725 and a rule constructor module 730.

The interactive visualization and user interface control 700 provides overall control of the interactions with the analyst 120 (FIG. 1) and the flow within the event management decision support system. The pattern learner 710 is invoked to perform step 410, shown in FIG. 3 and described in detail in the context of FIG. 4. That is, the pattern learner performs a process for query-based learning of a rule left-hand side. The rule constructor 730 in collaboration with the Rule DB access component 725 are used to perform step 430 in FIG. 3, which involves reading from and writing to the Rule DB 185 (FIG. 1). The rule constructor 730 is also used to aid in the performance of step 420 in FIG. 3 in combination with the analyst. The event miner 705 and event data access 720 components are used in combination to aid in visualization and similarity query functionality used in step 520 of FIG. 4, which requires reading the Event DB 180 (FIG. 1).

Figure 7:
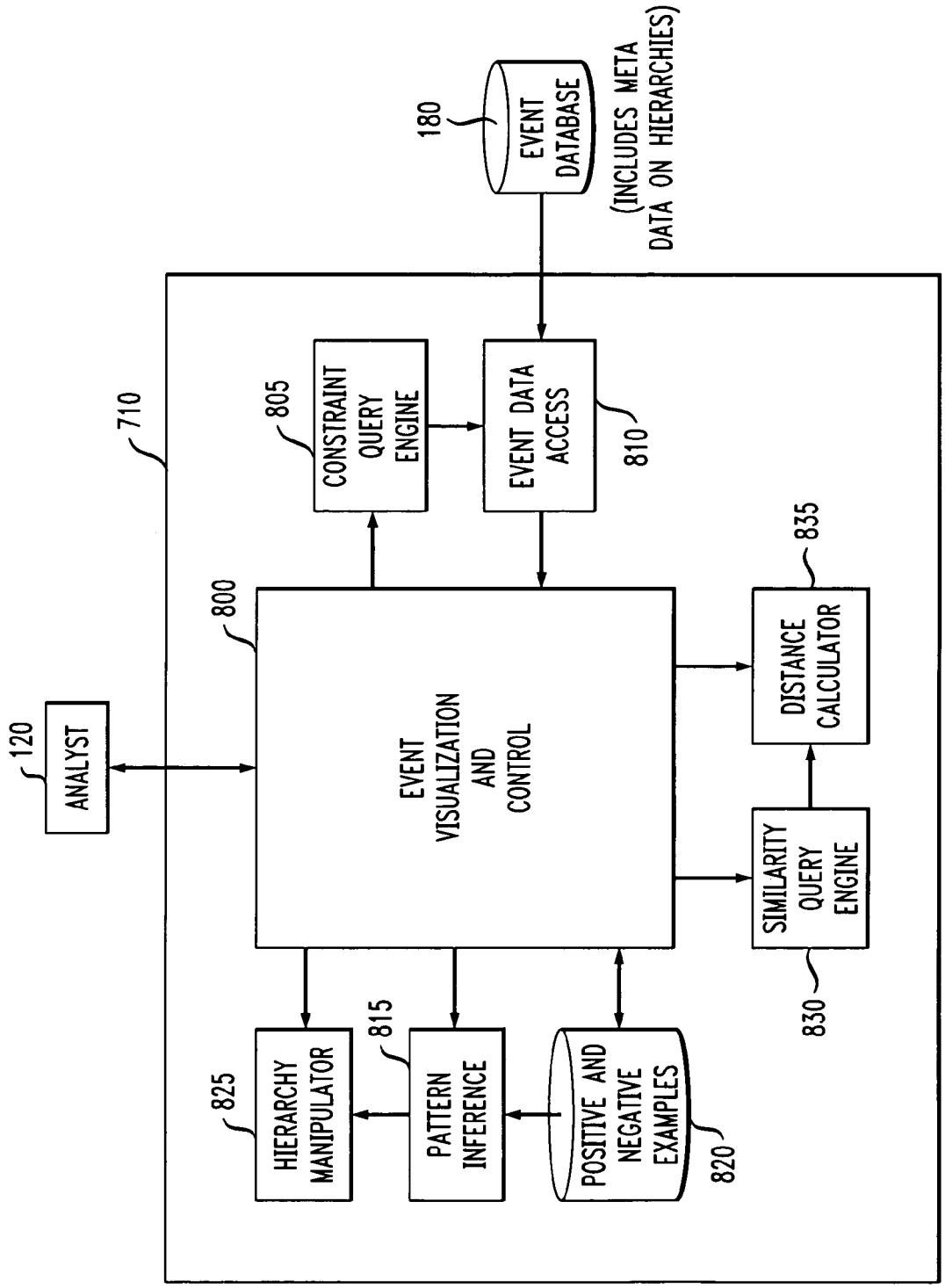
FIG. 7 is a block diagram illustrating a pattern learning system according to an embodiment of the present invention.

Referring now to FIG. 7, a block diagram illustrates a pattern learning system according to an embodiment of the present invention. Specifically, FIG. 7 details elements of the pattern learner module 710 of FIG. 6. As shown, the pattern learner comprises an event visualization and control module 800, a constraint query engine 805, an event access module 810, a pattern inference module 815, a positive and negative examples repository 820, a hierarchy manipulator module 825, a similarity query engine 830 and a distance calculator module 835.

The event visualization and control component 800 controls interactions with the analyst for purposes of learning event patterns. The event visualization and control component 800 also controls the flow within the pattern learner, including queries to the Event DB via the constraint query engine 805, which in turn invokes the event data access component 810 to read event data from the Event DB 180 (FIG. 1). In addition, the event visualization and control component 800 invokes the pattern inference component 815 to determine possible patterns in the set of positive and negative examples stored in repository 820, and establishes abstraction hierarchies, as explained above, used by the hierarchy manipulator 825 that is employed by the pattern inference module 815. The event visualization and control module 800 also updates the set of positive and negative examples in repository 820 and invokes the similarity query engine 830 to aid in finding other positive and negative examples. Doing so requires specifying numerical distances between patterns, which module 800 specifies through interactions with the distance calculator 835, a component that is invoked by the similarity query engine.

Figure 8:
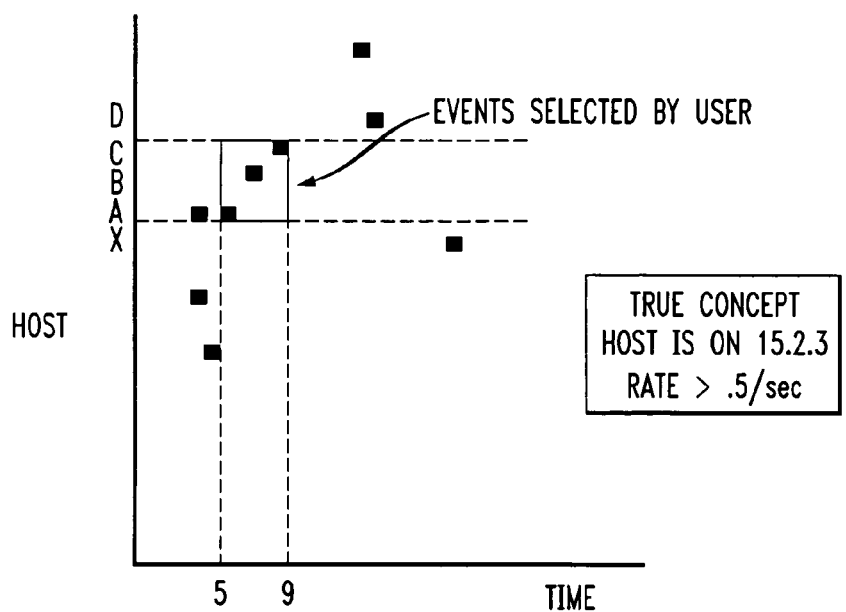
FIG. 8 is a diagram illustrating a user interface according to an embodiment of the present invention for inputting the information in step 500 in FIG. 4.
Figure 9:
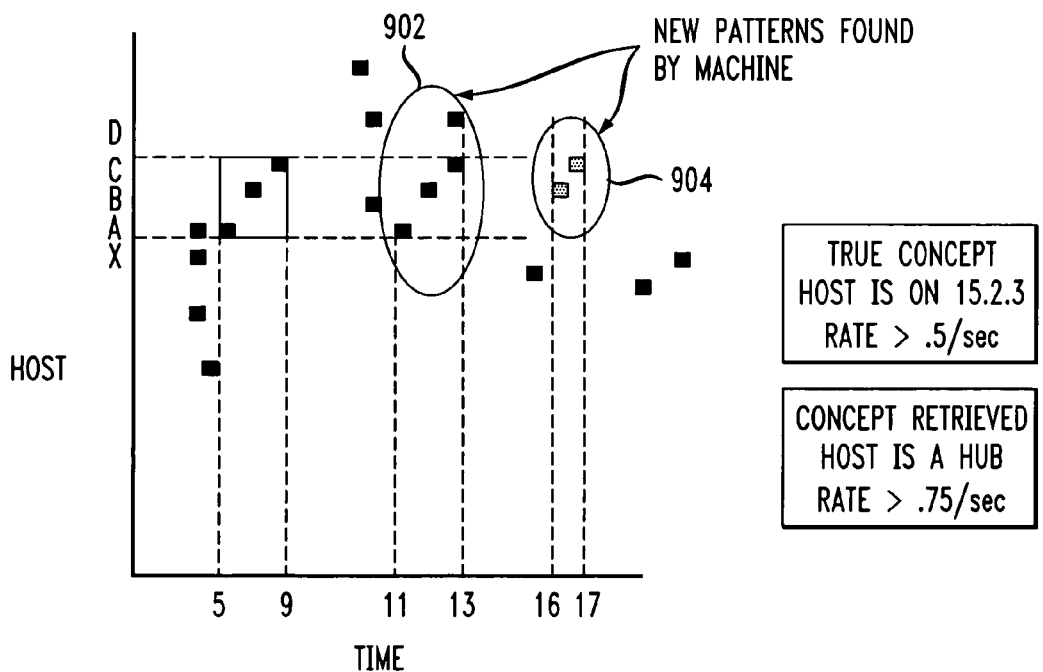
FIG. 9 is a diagram illustrating a user interface according to an embodiment of the present invention for presenting the results of steps 505, 510 and 520 in FIG. 4.
Figure 10:
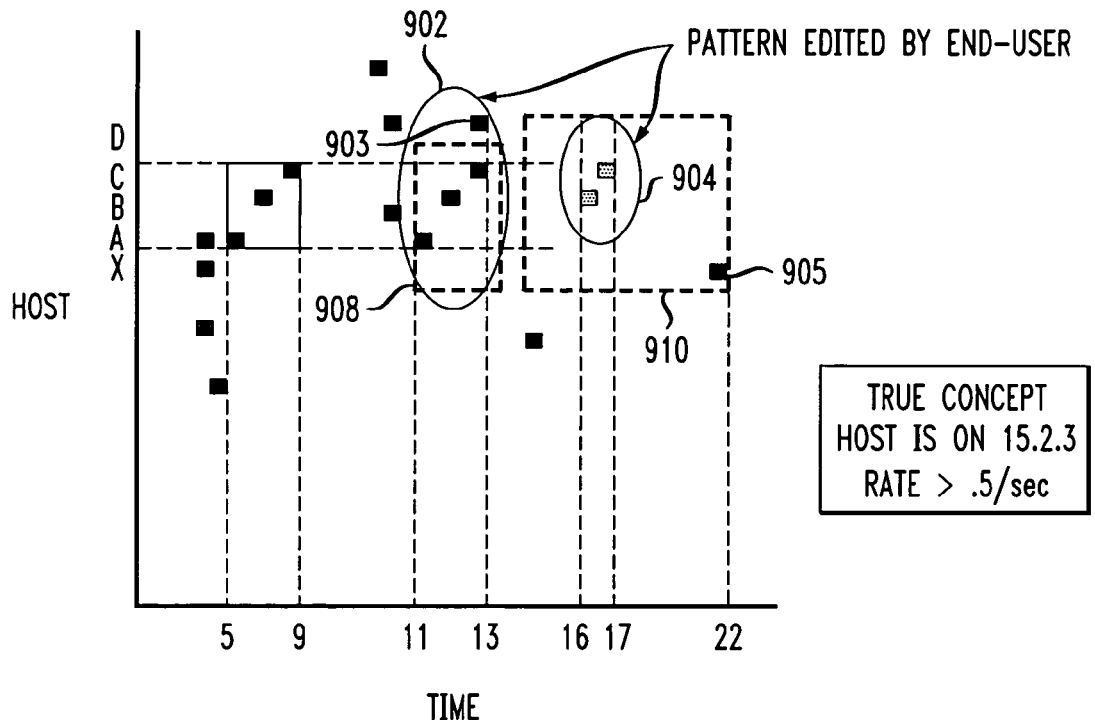
FIG. 10 is a diagram illustrating a user interface according to an embodiment of the present invention for accomplishing step 530 of FIG. 4.

FIGS. 8, 9, and 10 illustrate how analysts may interact with the machine-aided rule construction system of the invention to construct correlation rules. FIG. 8 illustrates a user interface that can be employed to input the information in step 500 in FIG. 4. Specifically, FIG. 8 shows a scatter plot. The x-axis is time and the y-axis is the host from which an event originated. The latter is categorical and so can be ordered in any manner that is convenient for visualizing patterns. The user has selected a set of events (depicted as squares) between times 5 and 9 and for hosts C, B, and A. A, B and C are hubs attached to subnetwork 15.2.3. X is not a hub and is on subnet 15.2.3. D is a hub but is not attached to subnet 15.2.3. This is an example of an underlying concept that the analyst knows but cannot articulate in a computer encoded manner. For the purposes of this example, the true concept contains all events that are on subnet 15.2.3 and for which the rate of the event set (count divided by time) exceeds 0.5 per second.

FIG. 9 displays the results of steps 505, 510, and 520 in FIG. 4. Here, the machine has inferred from the example of FIG. 8 the concept that events originate from a hub and that the rate exceeds 0.75 per second. Specifically, FIG. 9 shows the results of applying the abstraction hierarchies of FIG. 5 to FIG. 8. Accordingly, the process progresses from FIG. 8 to FIG. 9 by going down one more level in the configuration element hierarchy 605 in FIG. 5. As shown in FIG. 9, two new patterns that have been found by the machine that are consistent with this concept are circled (circles 902 and 904).

FIG. 10 shows how the analyst accomplishes step 530 in FIG. 4. The analyst has edited the patterns found by the machine to be consistent with the analyst's concept, denoted as dashed line rectangles 908 and 910. Specifically, in one case (908) an event is excluded (i.e., event 903); in the other (910), a previously excluded event is included (i.e., event 905). As mentioned, the analyst may select a desired pattern by using a mouse, or any other pointing device, to draw a box around the events in the visualization that are to be considered a group.

Figure 11:
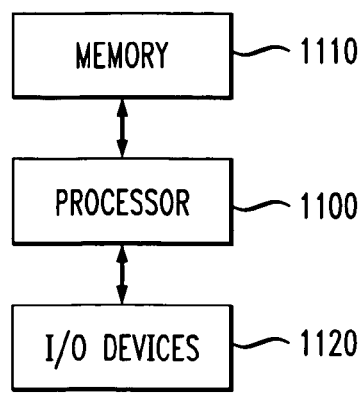
FIG. 11 is a block diagram illustrating a generalized hardware architecture of a computer system suitable for implementing a machine-aided rule construction system for use in event management according to the present invention.

Referring now to FIG. 11, a block diagram is shown illustrating a generalized hardware architecture of a computer system suitable for implementing the various functional components/modules of an event management decision support system 130 as depicted in the figures and explained in detail herein. It is to be understood that the individual components of the event management decision support system may be implemented on one such computer system, or on more than one separate such computer system. Also, individual components of the system may be implemented on separate such computer systems. It is also to be appreciated that the event management system 110, Event DB 180 and Rule DB 185 may be implemented on one or more such computer systems.

As shown, the computer system may be implemented in accordance with a processor 1100, a memory 1110 and I/O devices 1120. It is to be appreciated that the term "processor" as used herein is intended to include any processing device, such as, for example, one that includes a CPU (central processing unit) and/or other processing circuitry. The term "memory" as used herein is intended to include memory associated with a processor or CPU, such as, for example, RAM, ROM, a fixed memory device (e.g., hard drive), a removable memory device (e.g., diskette), flash memory, etc. In addition, the term "input/output devices" or "I/O devices" as used herein is intended to include, for example, one or more input devices, e.g., keyboard, mouse, etc., for entering data to the processing unit, and/or one or more output devices, e.g., CRT display, printer, etc., for presenting results associated with the processing unit. For example, user interfaces of the system employed by an analyst may be realized through such I/O devices. It is also to be understood that the term "processor" may refer to more than one processing device and that various elements associated with a processing device may be shared by other processing devices. Accordingly, software components including instructions or code for performing the methodologies of the invention, as described herein, may be stored in one or more of the associated memory devices (e.g., ROM, fixed or removable memory) and, when ready to be utilized, loaded in part or in whole (e.g., into RAM) and executed by a CPU.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A computer-based method of constructing one or more correlation rules for use by an event management system for managing a network with one or more computing devices, the method comprising the steps of:
   selecting one or more event patterns representing event data associated with the network of computing devices being managed by the event management system;
   automatically learning predicates of the one or more correlation rules from the one or more selected event patterns; and
   adding one or more corresponding actions to the one or more automatically learned predicates to form the one or more correlation rules.

2. The method of claim 1, further comprising the step of storing the one or more correlation rules in a rule database for access by the event management system.

3. The method of claim 1, wherein the event pattern selection step further comprises the step of a user marking the one or more event patterns in accordance with a data visualization of at least a portion of the event data.

4. The method of claim 1, wherein the event pattern selection step employs a data mining algorithm.

5. The method of claim 1, wherein the automatic predicate learning step comprises the steps of:
   learning an initial concept;
   determining if acceptance criteria are met given the event data;
   querying historical event data for similar event patterns; and
   allowing the user to edit the initial concept based on the historical event data query.

6. The method of claim 1, wherein the automatic predicate learning step utilizes one or more abstraction hierarchies.

7. The method of claim 6, wherein the one or more abstraction hierarchies comprise a hierarchy for at least one of a host and an event type.

8. Apparatus for constructing one or more correlation rules for use by an event management system for managing a network with one or more computing devices, the apparatus comprising:
   at least one processor operative to: (i) permit selection of one or more event patterns representing event data associated with the network of computing devices being managed by the event management system; (ii) automatically learn predicates of the one or more correlation rules from the one or more selected event patterns; and (iii) add one or more corresponding actions to the one or more automatically learned predicates to form the one or more correlation rules; and
   a memory, coupled to the at least one processor, which stores the one or more correlation rules for access by the event management system.

9. The apparatus of claim 8, wherein the event pattern selection operation further comprises a user marking the one or more event patterns in accordance with a data visualization of at least a portion of the event data.

10. The apparatus of claim 8, wherein the event pattern selection operation employs a data mining algorithm.

11. The apparatus of claim 8, wherein the automatic predicate learning operation further comprises: (i) learning an initial concept; (ii) determining if acceptance criteria are met given the event data; (iii) querying historical event data for similar event patterns; and (iv) allowing the user to edit the initial concept based on the historical event data query.

12. The apparatus of claim 8, wherein the automatic predicate learning operation utilizes one or more abstraction hierarchies.

13. The apparatus of claim 12, wherein the one or more abstraction hierarchies comprise a hierarchy for at least one of a host and an event type.

14. An article of manufacture for constructing one or more correlation rules for use by an event management system for managing a network with one or more computing devices, the article comprising a machine readable medium containing one or more programs which when executed implement at least one of the steps of:
   selecting one or more event patterns representing event data associated with the network of computing devices being managed by the event management system;
   automatically learning predicates of the one or more correlation rules from the one or more selected event patterns; and
   adding one or more corresponding actions to the one or more automatically learned predicates to form the one or more correlation rules.

15. The article of claim 14, further comprising the step of storing the one or more correlation rules in a rule database for access by the event management system.

16. The article of claim 14, wherein the event pattern selection step further comprises the step of a user marking the one or more event patterns in accordance with a data visualization of at least a portion of the event data.

17. The article of claim 14, wherein the event pattern selection step employs a data mining algorithm.

18. The article of claim 14, wherein the automatic predicate learning step comprises the steps of:
- learning an initial concept;
- determining if acceptance criteria are met given the event data;
- querying historical event data for similar event patterns; and
- allowing the user to edit the initial concept based on the historical event data query.

19. The article of claim 14, wherein the automatic predicate learning step utilizes one or more abstraction hierarchies.

20. The article of claim 19, wherein the one or more abstraction hierarchies comprise a hierarchy for at least one of a host and an event type.

* * * * *